United States Patent [19]

Albanesius et al.

[11] Patent Number: 5,132,598
[45] Date of Patent: Jul. 21, 1992

[54] HIGH TORQUE INHIBITOR

[75] Inventors: David H. Albanesius, Philadelphia; Bernard W. Jalbert, Richboro, both of Pa.

[73] Assignee: Yale Materials Handling Corporation, Flemington, N.J.

[21] Appl. No.: 534,436

[22] Filed: Jun. 6, 1990

Related U.S. Application Data

[63] Continuation of Ser. No. 184,346, Apr. 21, 1988, Pat. No. 4,933,611.

[51] Int. Cl.⁵ .............................................. H02P 3/12
[52] U.S. Cl. .................................. 318/285; 318/373; 318/380; 318/459
[58] Field of Search ............... 388/803, 826, 843, 849; 318/285, 373, 380, 283, 284, 383, 374, 459

[56] References Cited

U.S. PATENT DOCUMENTS

| | | | |
|---|---|---|---|
| 2,817,802 | 12/1957 | Roggenkamp | 318/284 |
| 2,904,737 | 9/1959 | Peeples et al. | |
| 2,990,506 | 6/1961 | Montross | |
| 3,213,343 | 10/1965 | Sheheen | |
| 3,344,328 | 9/1967 | Morris | 318/258 |
| 3,551,769 | 12/1970 | Tedd | |
| 3,597,669 | 8/1971 | Soltz | 318/17 |
| 3,617,835 | 11/1971 | Dreher | |
| 3,628,112 | 12/1971 | Gross | 318/258 |
| 3,694,721 | 9/1972 | Henry | 318/373 X |
| 3,710,216 | 1/1973 | Smith | 318/373 |
| 3,819,997 | 6/1974 | Morton et al. | |
| 3,911,342 | 10/1975 | Herwig | |
| 3,947,740 | 3/1976 | Tsuboi | 318/376 |
| 3,965,404 | 6/1976 | Petersen | 318/261 |
| 3,980,934 | 9/1976 | Wright | |
| 4,011,492 | 3/1977 | Murphy et al. | 318/373 |
| 4,051,421 | 9/1977 | Brinner et al. | 318/367 |
| 4,134,049 | 1/1979 | Gray | |
| 4,144,482 | 3/1979 | Schwab | 318/381 |
| 4,206,389 | 6/1980 | Snyder | 388/806 |
| 4,249,118 | 2/1981 | Roof | 318/484 X |
| 4,264,846 | 4/1981 | Sauer et al. | 318/249 |
| 4,355,267 | 10/1982 | Franz, Jr. et al. | 318/89 |
| 4,365,189 | 12/1982 | Hawkins et al. | |
| 4,378,580 | 3/1983 | Stich | 361/91 |
| 4,392,091 | 7/1983 | Roberts et al. | 318/52 |
| 4,423,363 | 12/1983 | Clark et al. | 318/376 X |
| 4,496,888 | 1/1985 | Campbell | |
| 4,551,659 | 11/1985 | Markham | 318/258 |
| 4,680,513 | 7/1987 | Kennedy | |

FOREIGN PATENT DOCUMENTS

| | | |
|---|---|---|
| 55-26018 | 2/1980 | Japan |
| 1177071 | 1/1970 | United Kingdom |
| 1177072 | 1/1970 | United Kingdom |

*Primary Examiner*—Bentsu Ro
*Attorney, Agent, or Firm*—Brooks & Kushman

[57] ABSTRACT

Apparatus for inhibiting high torque created by the application of reverse voltage to a conventional motor with a field coil and armature operating in the opposite direction comprising a pair of drive resistors in series with the motor, a corresponding normally open contact connected in parallel to each respective drive resistor, an energizing coil corresponding to each contact, a timing circuit and an inhibitor circuit. During high speed forward operation, both coils are energized, closing both contacts, shorting out both drive resistors and maximizing motor voltage. When reverse operation is desired, a reverse voltage is applied across the armature, resetting the timing circuit and activating the inhibitor circuit. The inhibitor circuit will deenergize the coils, opening the contacts and remove the short across the drive resistors and thus reduce the reverse voltage being applied and permit gradual deacceleration. When armature speed nears zero, the inhibitor circuit deactivates and the energizing coils reenergize, increasing reverse motor voltage upon the expiration of the time delay of the timing circuit.

2 Claims, 1 Drawing Sheet

HIGH TORQUE INHIBITOR

This is a continuation of co-pending application Ser. No. 184,346 filed on Apr. 21, 1988, now U.S. Pat. No. 4,933,611.

BACKGROUND OF THE INVENTION

I. Field of the Present Invention

This invention relates generally to an apparatus for controlling the speed of a motor and more specifically, this invention relates to an apparatus which inhibits the application of high torque when a motor operating at high speed in a first direction is switched to run in reverse direction.

II. Description of the Prior Art

In certain lift trucks, particularly in those lift trucks known as "walking trucks", the speed is controlled by varying the resistance in the DC motor circuit. Such lift trucks have three discrete speeds: first, second and third, depending on the series resistance to the DC motor.

When switching from forward to reverse direction is desired, the operator will often attempt to accomplish such a result by "plugging" the motor. "Plugging" commonly refers to reversing the direction of current in the field of a motor while it is still operating in the opposite direction. When the operator of such walking trucks shifts from the highest forward speed to reverse, a very high torque is imposed upon the unit. Such high torques have been known to cause loads carried by the trucks to spill and have caused the operators to fall from the truck itself thus causing injuries.

In order to avoid the high torque imposed upon a series resistor controlled DC motor type truck upon shifting from high speed forward directly to reverse, some technique must be employed to control deceleration of the DC motor armature from its velocity in the forward direction to zero velocity and thereafter to control acceleration of the DC motor in the opposite, or reverse direction. In a first attempt to solve this problem, the present inventors employed a circuit which sensed a change in direction of armature voltage, thus indicating that the operator intended to change direction of the truck. Upon sensing a change in direction in the armature voltage, previous control apparatus included a timing circuit which precluded reverse operation of the truck until a predetermined time had elapsed. This solution proved to be less than satisfactory because once the time delay had expired, the motor armature would be immediately subjected to maximum decelerating torque, which would result in an abrupt change similar to the undesired high torque problem. Another drawback to this solution was that when the truck was shifted from reverse to forward, the timing circuit prevented suitable acceleration of the truck.

SUMMARY OF THE INVENTION

Apparatus for inhibiting the high torque during the plugging of a series-resistor controlled motor comprises a conventional truck motor with a field coil and armature, a pair of drive resistors in series with the motor, corresponding normally open drive resistor contacts in parallel to their respective drive resistor, an energizing coil corresponding to each drive resistor contact, a timing circuit and an inhibitor circuit. When high forward speed operation is desired, both coils are energized, which closes both drive resistor contacts, shorting out the drive resistors and maximizing motor voltage. When the motor is switched to operate in the reverse direction, the current in the field coil is reversed, causing a reversal of the counter EMF induced in the armature. The reversed armature voltage will reset the timing circuit as well as activate the inhibitor circuit which shorts the timing circuit capacitor. As a result, the coils will deenergize, opening the drive resistor contacts and eliminating the short across the drive resistors. The low reverse motor voltage, which is acting as a decelerator for the existing forward motion of the armature, will permit the gradual deceleration of the forward motion of the armature without high torque. Once forward armature motion has slowed to a near-zero speed, the inhibiting circuit will deactivate, permitting the timing circuit to operate. At the end of the time delay, the timing circuit will begin to conduct, energizing the drive resistor coils, which will again close the drive resistor contacts, shorting the drive resistors, and permitting maximum reverse voltage across the motor.

A purpose of this invention is to control deceleration of a motor armature when reversing the voltage applied across the motor. Another purpose of this invention is to avoid dangerous decelerating torque by limiting the amount of reverse voltage applied across the motor during plugging. Yet another purpose of this invention is to delay the application of maximum reverse voltage across the motor until the armature has begun to move in the desired direction.

BRIEF DESCRIPTION OF THE DRAWINGS

The present invention may be better understood and its numerous objects and advantages will become apparent to those skilled in the art by reference to the following detailed description and the accompanying drawings.

DESCRIPTION OF THE PREFERRED EMBODIMENT OF THE INVENTION

Figure 1:
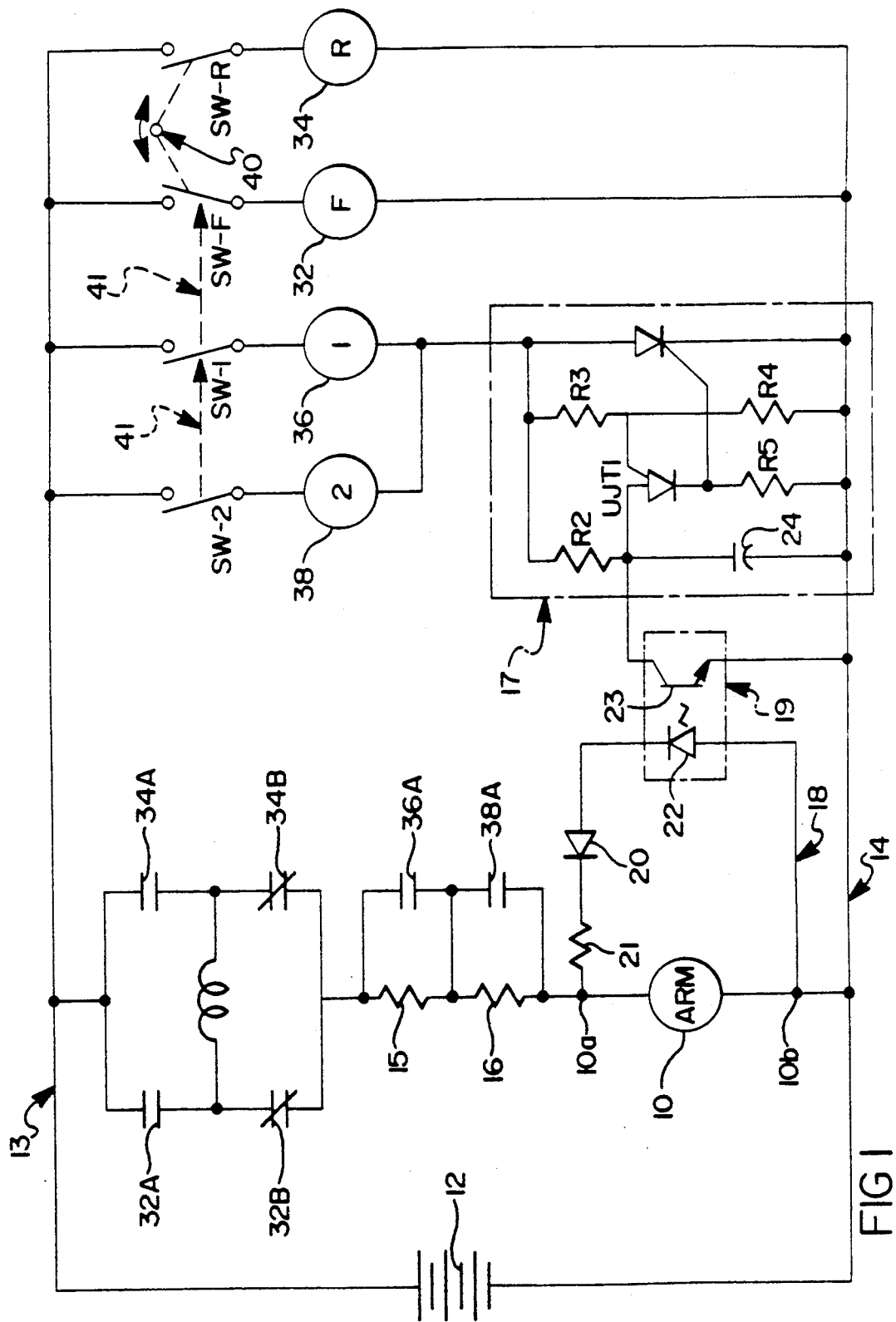
FIG. 1 is a schematic diagram of the electrical circuit of a motor utilizing the control apparatus of the present invention.

Referring to FIG. 1, an electrical circuit which embodies the invention is shown. The armature 10 and field coil 11 represent parts of a conventional truck motor connected across the positive and negative sides 13 and 14 of power supply 12. Drive resistors 15 and 16 are connected in series between field coil 11 and armature 10. The opposed ends of field coil 11 are adapted to be connected to the drive resistors 15 and 16 and to the positive side 13 through either the normally open contact 32A and the normally closed contact 34B or through the normally open contact 34A and the normally closed contact 32B.

The arrangement is such that the pairs of contacts 32A-34B and 34A-32B can establish opposed directional circuits. Closing of the contact 32A conditions the motor to drive in a forward direction, and opening of the normally open contact 32A and the closing of the normally open contact 34A reverses the voltage on the field coil 11 whereby the motor drives the truck in reversed direction Contacts 32A and 32B controlled by energizing coil 32 and contacts 34A and 34B are controlled by energizing coil 34. When coil 32 is energized, normally open contact 32A will close and normally closed contact 32B will open. When coil 34 is energized, normally open contact 34A will close and normally closed contact 34B will open. The deenergizing of coils 32 and 34 will open each coil's normally-open contact (32A,34A) and close its normally-closed contact (32B,34B) respectively. The energization of coils 32 and 34 are controlled by switch SW-F and switch SW-R respectively.

Drive resistors 15 and 16, which are, as mentioned earlier, connected in series between field coil 11 and armature 10, control the motor speed. Control of the total resistance between the field coil 11 and the armature 10 will control the motor speed. In such a manner, varying the resistance between the field and armature will permit the motor speed to be varied also.

To accomplish this goal, each drive resistor 15 and 16 has a normally open contact 36A and 38A, respectively, connected in parallel across each respective drive resistor When contact 36A is closed, drive resistor 15 is short-circuited and the total resistance between field coil 11 and armature 10 drops and motor speed will increase to a second speed. When contact 38A is closed, drive resistor 16 is shorted, minimizing resistance between field coil 11 and armature 10 and motor speed will increase to a third speed.

For closing contacts 36A and 36B, coils 36 and 38 are utilized. When coils 36 and 38 are energized, contacts 36A and 38A close and when coils 36 and 38 are deenergized, contacts 36A and 38A will reopen. The energizing of coils 36 and 38 are controlled by switches SW-1 and SW-2 and are further controlled by the operation of timing circuit 17. Switches SW-1 and SW-2 may be connected for sequential operation with switches SW-F and SW-R as diagrammatically indicated at 41. Timing circuit 17 is a conventional uninjunction timing circuit such as is displayed in General Electric's SCR Manual, 5th Edition, page 218.

The operation of the motor in switching from its lowest speed to higher speeds occurs as follows: During operation in the lowest forward speed, switch SW-F is closed, coil 32 is energized, contacts 32A and 34B are closed, and field coil 11 drives the motor in a forward direction. Both drive resistors 15 and 16 are in the circuit, and armature 10 operates at its lowest speed. When a higher speed is desired, switch SW-1 is closed, activating timing circuit 17. At the end of the time delay, typically 0.3 seconds, coil 36 is energized, closing contact 36A which, in turn, shorts out drive resistor 15, decreasing the total drive resistance and increasing the motor speed to a higher level. A time delay is interposed between the closing of switch SW-1 and the energizing of coil 36 by timing circuit 17 to prevent a too rapid acceleration from rest to the higher forward speeds. By requiring a time delay between speeds F and 1, it is ensured that the motor will be operating at speed F before acceleration to speed 1 is attempted. When acceleration to the highest speed 2 is desired, switch SW-2 is closed. As the timing circuit 17 is still conducting, coil 38 energizes without delay, closing contact 38A which minimizes the drive resistance and permits the motor to accelerate to maximum speed.

Plugging occurs when switching from a forward speed to a reverse speed is desired. By opening switch SW-F and closing switch SW-R, contact 32A and contact 34B will open and the contact 34A and contact 32B will close, reversing the polarity of field coil 11 and the direction of the motor. However, the armature 10 will continue to rotate in the forward direction due to momentum and plugging will commence. Switches SW-F and SW-R may be interconnected for mutually exclusive operation as diagrammatically indicated at 40.

To reduce the amount of torque imparted due to the plugging effect, this invention contemplates the temporary reduction of the reverse motor voltage to reduce the severity of plugging. By reversing the polarity of the field coil 11 while the motor is operating in a forward direction, a back EMF of reverse voltage polarity is induced across the armature 10. When a positive voltage is applied at junction 10b, timing circuit 17 is reset and the inhibitor circuit 18 is activated. The inhibitor circuit 18 is connected across the armature 10 and is comprised of an optocoupler 19 connected in series with a diode 20 and a resistor 21. The cathode of the diode 20 is connected at the positive armature terminal 10a. The optocoupler 19 is comprised of a light-emitting diode 22 and a transistor 23. The transistor 23 is connected across the timing circuit capacitor 24 with the transistor collector connected at the positive capacitor terminal.

During forward acceleration of the armature 10, terminal 10a will be positive with respect to 10b, the inhibitor circuit 18 will be non-conducting due to the presence of diode 20 and the timing circuit 17 will operate as described above. However, when field coil 11 polarity is reversed, a positive voltage is applied at terminal 10b and detected by the attached inhibitor circuit 18. In response to this positive voltage, light-emitting diode 22 begins to conduct, turning on transistor 23 which shorts out timing capacitor 24 and inhibits the reset timing circuit 17 from operating. The timing circuit 17 will remain non-conducting while transistor 23 is powered, open-circuiting coil 36 and coil 38. Coil 36 and coil 38 will then deenergize, opening contacts 36A and 36B, and removing the short across drive resistors 15 and 16. Drive resistors 15 and 16, in turn, reduce the reverse motor voltage and, in such manner, reduce the reverse torque imparted to the armature 10 to permit smooth deceleration of the truck. As deceleration continues, the induced voltage across the armature decreases.

When the truck has reached near-zero speed, the voltage across the armature is insufficient to allow light-emitting diode 22 to power transistor 23. Th short across timing circuit capacitor 24 is removed and the inhibiting of timing circuit 17 ends. At the end of th designated time delay, timing circuit 17 will begin to conduct. Coils 36 and 38 will energize, closing contacts 36A and 38A, shorting drive resistors 15 and 16 and permitting maximum reverse voltage to be applied to the armature 10. At the time at which maximum reverse torque is applied, the truck will have begun to accelerate in a reverse direction and the change will be much less abrupt. The near-zero speed at which inhibitor circuit 18 deactivates may be adjusted by varying the value of resistor 21.

Thus, there has been described and illustrated here apparatus for inhibiting high torque during the plugging of a series-resistor controlled motor. However, those skilled in the art will recognize that many modifications and variations besides those specifically mentioned may be made without departing substantially from the scope and spirit of the present invention. Accordingly, it should be clearly understood that the form of the invention described herein is exemplary only and is not intended as a limitation on the scope of the present invention.

What is claimed is:

1. In combination with a reversible motor circuit having a motor with a field coil and an armature, switch means for operating said motor at a plurality of speeds in either direction and permitting plugging, the improvement comprising:

means for detecting the application of a reverse voltage across said armature during plugging and generating a response signal;

means for limiting the voltage applied to said field coil during plugging by adding resistance in series with said field coil in response to said response signal until said response signal decreases to a predetermined level; and timer means for delaying operation of said switch means at at least one of said plurality of speeds.

2. In combination with a reversible motor circuit having a motor with a field coil in series with an armature, switch means for operating said motor at a plurality of speeds in either direction and permitting plugging, the improvement comprising:

means for detecting the application of a reverse voltage across said armature during plugging and generating a response signal;

means for limiting the voltage applied to said field coil during plugging by adding resistance in series with said field coil and said armature in response to said response signal until said response signal decreases to a predetermined level; and timer means for delaying operation of said switch means at at least one of said plurality of speeds.

* * * * *